United States Patent
Hu et al.

(10) Patent No.: US 10,401,641 B2
(45) Date of Patent: Sep. 3, 2019

(54) CAMERA SYSTEM AND LENS UNIT THEROF

(71) Applicant: TDK TAIWAN CORP., Yangmei Taoyuan (TW)

(72) Inventors: Chao-Chang Hu, Yangmei Taoyuan (TW); Chen-Hsien Fan, Yangmei Taoyuan (TW); Cheng-Kai Yu, Yangmei Taoyuan (TW); Chih-Wei Weng, Yangmei Taoyuan (TW); Shu-Shan Chen, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 34 days.

(21) Appl. No.: 15/499,428

(22) Filed: Apr. 27, 2017

(65) Prior Publication Data

US 2017/0329151 A1 Nov. 16, 2017

Related U.S. Application Data

(60) Provisional application No. 62/334,090, filed on May 10, 2016, provisional application No. 62/357,557, filed on Jul. 1, 2016.

(51) Int. Cl.
*G02B 27/64* (2006.01)
*G02B 13/02* (2006.01)
*G02B 7/08* (2006.01)

(52) U.S. Cl.
CPC ............ *G02B 27/646* (2013.01); *G02B 7/08* (2013.01); *G02B 13/02* (2013.01)

(58) Field of Classification Search
None
See application file for complete search history.

(56) References Cited

U.S. PATENT DOCUMENTS

2013/0077945 A1* 3/2013 Liu .................. G02B 26/0841
396/55
2015/0215542 A1* 7/2015 Nomura ............ H04N 5/23287
348/208.11

* cited by examiner

*Primary Examiner* — Darryl J Collins
*Assistant Examiner* — Journey F Sumlar
(74) *Attorney, Agent, or Firm* — Muncy, Geissler, Olds & Lowe, P.C.

(57) ABSTRACT

A lens unit is provided, including a casing, a carrier, an optical lens, a first driving assembly, and a second driving assembly. The carrier is movably disposed in the casing, and the optical lens is disposed on the carrier. The first and second driving assemblies are provided to drive the carrier and the optical lens respectively to move along a first axis and a second axis relative to the casing. Specifically, when viewed along a direction perpendicular to an optical axis of the lens unit, the first and second driving assemblies do not overlap.

18 Claims, 9 Drawing Sheets

CAMERA SYSTEM AND LENS UNIT THEROF

CROSS REFERENCE TO RELATED APPLICATIONS

This application claims priority claims priority of provisional U.S. Patent Application Ser. No. 62/334,090 filed on May 10, 2016 and provisional U.S. Patent Application Ser. No. 62/357,557 filed on Jul. 1, 2016, the entirety of which is incorporated by reference herein.

BACKGROUND OF THE DISCLOSURE

Field of the Invention

The present invention relates to a camera system, and more particularly to a camera system and a lens unit thereof which are disposed in an electronic device.

Description of the Related Art

As the relevant technologies have developed, cameras have been applied widely in portable electronic devices, such as cell phones and tablet computers. However, when a long focal length lens is applied in an electronic device, the thickness thereof may adversely impede the prospects for miniaturization of the electronic device.

BRIEF SUMMARY OF THE DISCLOSURE

Accordingly, one objective of the present invention is to provide a lens unit, including a casing, a carrier, an optical lens, a first driving assembly, and a second driving assembly. The carrier is movably disposed in the casing, and the optical lens is disposed on the carrier. The first and second driving assemblies are provided to drive the carrier and the optical lens respectively to move along a first axis and a second axis relative to the casing. Specifically, when viewed along a direction perpendicular to an optical axis of the lens unit, the first and second driving assemblies do not overlap.

According to some embodiments of the disclosure, the first and second axes are substantially perpendicular to each other.

According to some embodiments of the disclosure, the first driving assembly includes a first magnetic element and a first axial coil adjacent to the first magnetic element, the second driving assembly includes a second magnetic element and a second axial coil adjacent to the second magnetic element, and when viewed along a direction parallel to the optical axis of the lens unit, the first and second magnetic elements at least partially overlap.

According to some embodiments of the disclosure, when viewed along the direction perpendicular to the optical axis of the lens unit, the first and second magnetic elements at least partially overlap the carrier.

According to some embodiments of the disclosure, the first driving assembly includes a first magnetic element and a first axial coil adjacent to the first magnetic element, the second driving assembly includes a second magnetic element and a second axial coil adjacent to the second magnetic element, and when viewed along the direction perpendicular to the optical axis of the lens unit, the second magnetic element and the carrier at least partially overlap.

According to some embodiments of the disclosure, the first driving assembly includes a first magnetic element and a first axial coil adjacent to the first magnetic element, the second driving assembly includes a second magnetic element and a second axial coil adjacent to the second magnetic element, and the first and second axial coils are disposed on opposite sides of the carrier.

According to some embodiments of the disclosure, the first driving assembly includes a plurality of first magnetic elements and a first axial coil adjacent to the first magnetic elements, and the first magnetic elements are disposed on opposite sides of an end surface of the carrier.

According to some embodiments of the disclosure, the optical lens forms a flat surface perpendicular to the first axis.

According to some embodiments of the disclosure, the first driving assembly includes a first magnetic element and a first axial coil adjacent to the first magnetic element, the second driving assembly includes a second magnetic element and a second axial coil adjacent to the second magnetic element, and the lens unit further comprises a third axial coil adjacent to the second magnetic element for moving the carrier and the optical lens relative to the casing along a third axis.

According to some embodiments of the disclosure, the lens unit further comprises a first position sensor, a second position sensor, and a third position sensor on the same side of the carrier, to respectively detect the positions of the optical lens and the carrier along the first, second and third axes.

According to some embodiments of the disclosure, the lens unit further comprises a circuit board, a resilient element, and a flexible member, wherein the second position sensor is disposed on the circuit board, the resilient element connects the casing to the carrier, and the flexible member has a rectangular cross-section and connects the resilient element to the circuit board.

Another objective of the present invention is to provide a camera system, including the aforesaid lens unit, an image sensor; and a reflecting unit. Light enters the reflecting unit along the first axis, and light is reflected by the reflecting unit along a third axis to the image sensor. The third axis is perpendicular to the first and second axes, and the image sensor and the reflecting unit are disposed on opposite sides of the lens unit.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it will be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1:
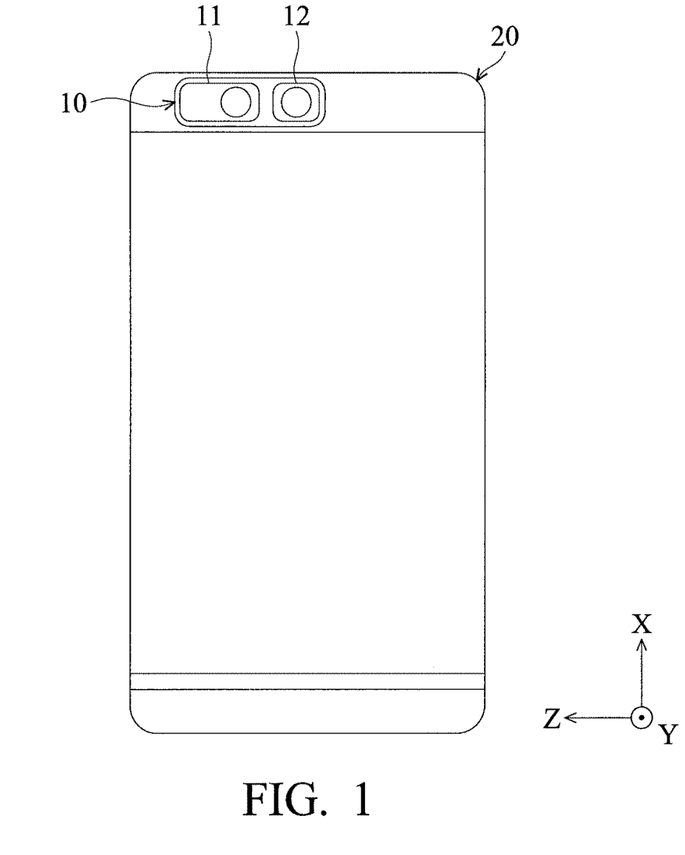
FIG. 1 shows a perspective diagram of an electronic device, in accordance with an embodiment of the invention.

Referring to FIG. 1, a camera system 10 according to an embodiment of the invention is disposed in an electronic device 20 such as smart phone or digital camera for photographing or video recording. The camera system 10 includes a telephoto lens module 11 and a wide angle lens module 12 respectively receiving light and generating an image. The images generated by the telephoto lens module 11 and the wide angle lens module 12 are subsequently transferred to a processor (not shown) in the electronic device 20 for image post processing.

Figure 2:
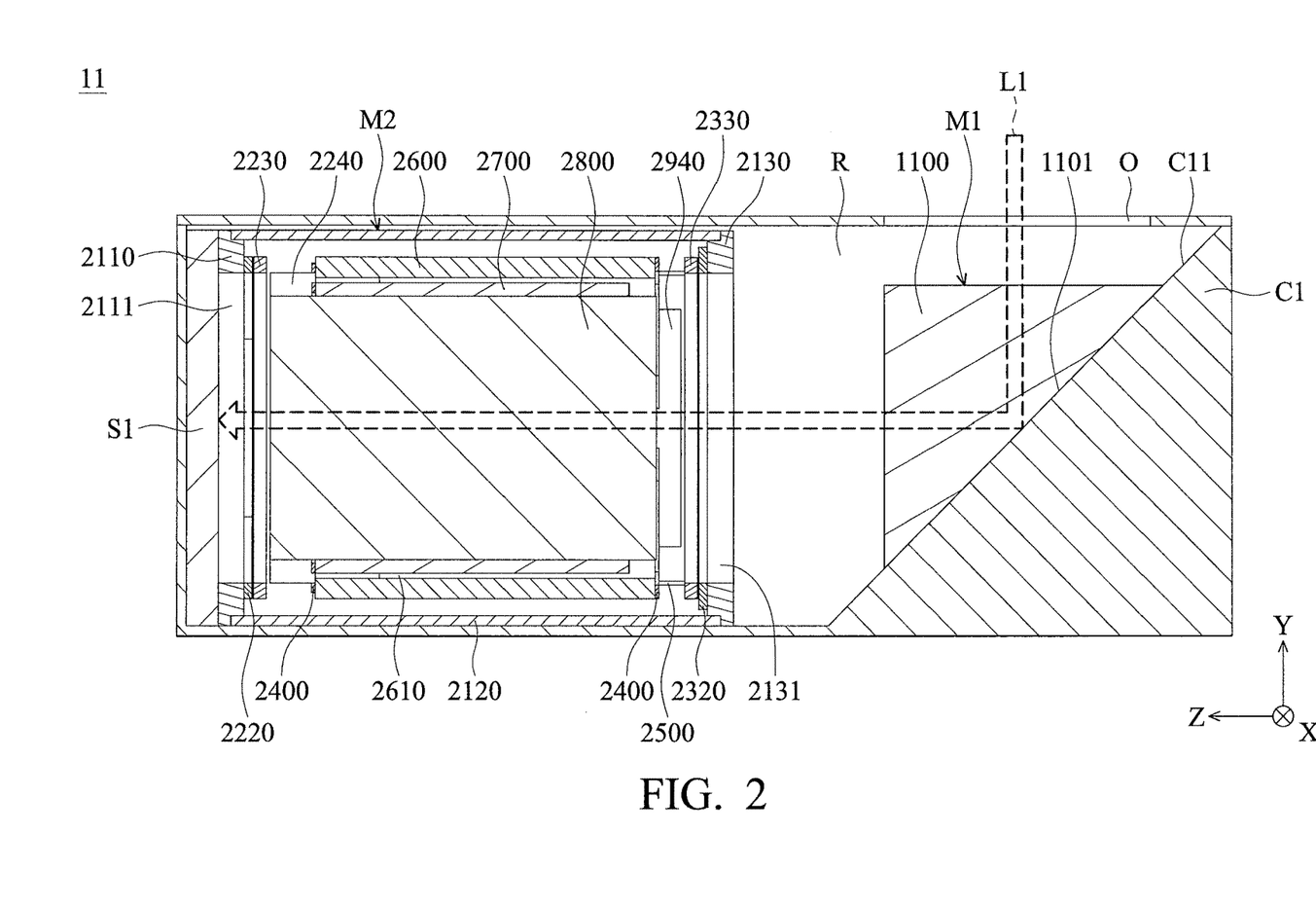
FIG. 2 shows a cross-sectional view of a telephoto lens module, in accordance with an embodiment of the invention.

As shown in FIG. 2, the telephoto lens module 11 primarily comprises a housing C1, a reflecting unit M1, a lens unit M2, and an image sensor S1, wherein the lens unit M2 is capable of auto focusing (AF) and optical image stabilization (OIS). The housing C1 forms a receiving space R communicated with an opening O on an upper surface of the housing C1. The reflecting unit M1, the lens unit M2, and the image sensor S1 are disposed in the receiving space R. Specifically, the reflecting unit M1 is disposed on a slope C11 of the housing C1, the lens unit M2 is disposed between the reflecting unit M1 and the image sensor S1, and the opening O is located right above the reflecting unit M1.

When external light L1 enters the telephoto lens module 11 along Y axis (first axis) through the opening O to the receiving space R, light L1 can be reflected by a reflecting surface 1101 on a prism 1100 of the reflecting unit M1 to the left, wherein the reflecting surface 1101 is parallel to the X axis (second axis) and angled relative to the Y and Z axes. Subsequently, light L1 propagates substantially along the Z axis (third axis) through the lens unit M2 and reaches the image sensor S1, so that an image can be generated on the image sensor S1.

Figure 3:
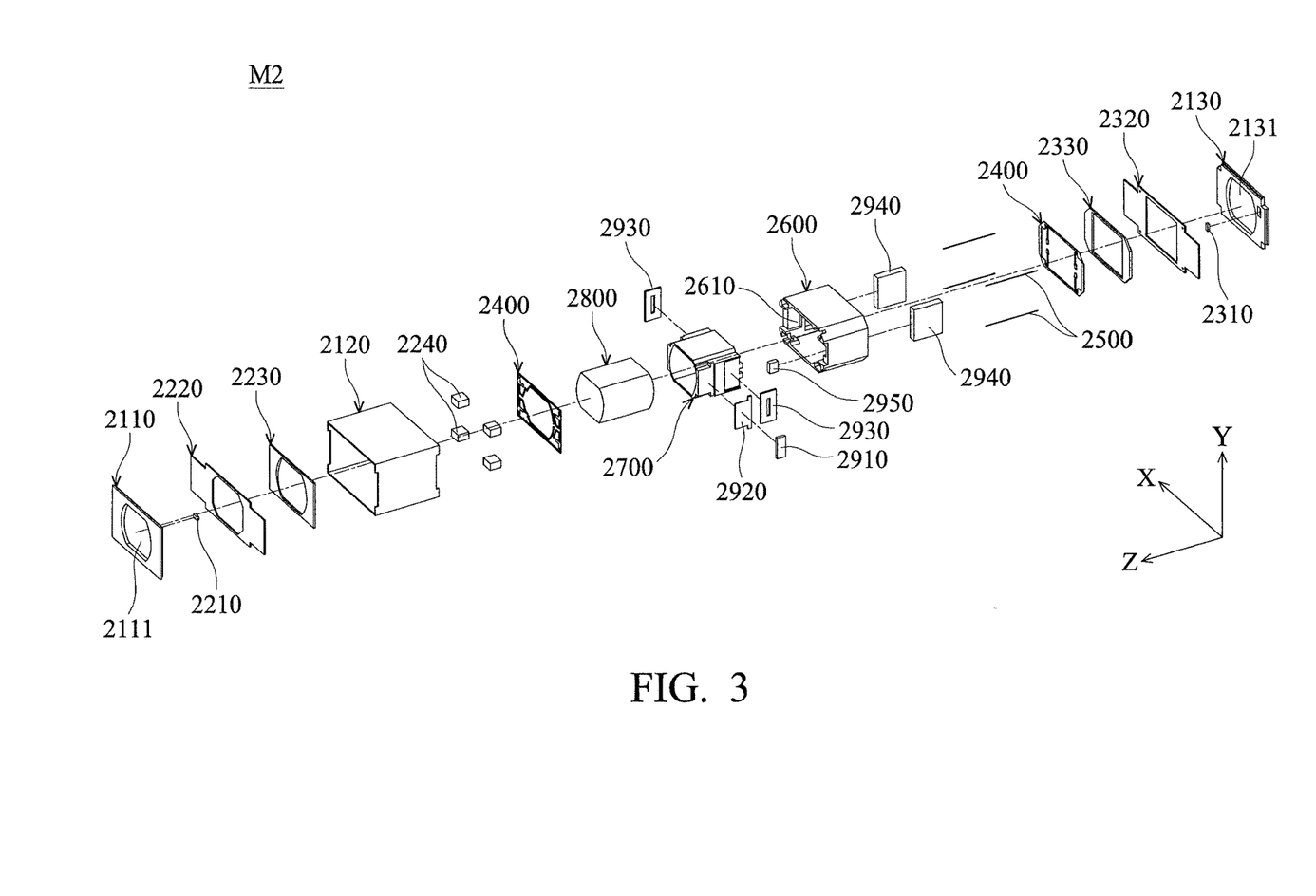
FIG. 3 shows an exploded diagram of the lens unit M2 in FIG. 2.

Referring to FIGS. 2 and 3, FIG. 3 is an exploded view of the lens unit M2 of the telephoto lens module 11. The lens unit M2 comprises a top cover 2110, a casing 2120, and a bottom cover 2130, wherein an optical lens 2800 is movably disposed in a chamber defined by the top cover 2110, the casing 2120, and the bottom cover 2130. It should be noted that the top cover 2110 and the bottom cover 2130 respectively form a hole 2111 and 2131 corresponding to the optical lens 2800. Light L1 is reflected by the reflecting unit M1 (FIG. 2) and propagates sequentially through the hole 2131, the optical lens 2800, and the hold 2111 to the image sensor S1 along the Z axis. As the top cover 2110, the casing 2120, and the bottom cover 2130 comprise non-conductive material, short circuit between the lens unit M2 and other electronic component can be avoided.

In this embodiment, a lens driving mechanism is arranged in the chamber formed by the top cover 2110, the casing 2120, and the bottom cover 2130 to move the optical lens 2800 along the Y axis or the X axis, so that optical image stabilization (OIS) of the lens unit M2 can be achieved. Additionally, as the optical lens 2800 can be moved along the Z axis by the lens driving mechanism, the distance between the optical lens 2800 and the image sensor S1 can be rapidly adjusted for auto focusing (AF). The configuration related to the lens driving mechanism is described below.

Still referring to FIGS. 2 and 3, two resilient elements 2400 (such as metal sheet), a frame 2600, and a carrier 2700 are provided in the lens unit M2. The two resilient elements 2400 are located on opposite sides of the carrier 2700 and connect the frame 2600 with the carrier 2700, so that the carrier 2700 is suspended and movable within a hollow portion 2610 of the frame 2600. As the optical lens 2800 is fixed in the carrier 2700, both of the optical lens 2800 and the carrier 2700 are movable relative to the frame 2600.

In this embodiment, the lens driving mechanism in the lens unit M2 primarily has the three functions of (1) detecting the movement of the optical lens 2800 along the Y axis (first axis) by a first axial position sensor 2210, a first axial printed circuit board 2220, a first axial coil 2230, and at least a first magnetic element 2240; (2) detecting the movement of the optical lens 2800 along the X axis (second axis) by a second axial position sensor 2310, a second axial printed circuit board 2320, a second axial coil 2330, and at least a second magnetic element 2940; and (3) detecting the movement of the optical lens 2800 along the Z axis (third axis) by a third axial position sensor 2910, a third axial printed circuit board 2920, a third axial coil 2930, a third axial sensing object 2950, and at least a second magnetic element 2940. It should be noted that the second magnetic element 2940 can cooperate with the second and third axial coils 2330 and 2930 at the same time, so as to force the optical lens 2800 and the carrier 2700 moving relative to the housing 2120 respectively along the X and Z axes.

As depicted in FIGS. 2 and 3, the first axial position sensor 2210, the first axial printed circuit board 2220, the first axial coil 2230, and the first magnetic elements 2240 are disposed on the left side of the frame 2600 and the carrier 2700. The first axial printed circuit board 2220 is connected to the top cover 2110, and the top cover 2110 is fixed to the housing 2120. The first axial position sensor 2210 is disposed on the first axial printed circuit board 2220 to detect the position of the first magnetic elements 2240 along the Y axis.

Moreover, FIGS. 2 and 3 show that the frame 2600 and the carrier 2700 are disposed between the first and second axial coils 2230 and 2330, wherein the first axial coil 2230 is fixed to the first axial printed circuit board 2220, and the first magnetic elements 2240 are affixed to four corners of the carrier 2700. When an electrical current is applied to the first axial coil 2230, a magnetic force is generated between the first axial coil 2230 and the first magnetic elements 2240, so that the frame 2600, the carrier 2700, and the optical lens 2800 can be moved relative to the first axial printed circuit board 2220 along the Y axis, and the function of optical image stabilization (OIS) can be therefore achieved.

As shown in FIGS. 2 and 3, the second axial printed circuit board 2320 and the second axial coil 2330 are disposed between the bottom cover 2130 and the carrier 2700, and the second axial position sensor 2310 and the second axial coil 2330 are disposed on the second axial printed circuit board 2320. The second axial position sensor 2310 is used for detecting the position of the second magnetic element 2940 along the X axis. It should be noted that the frame 2600, the carrier 2700, and the optical lens 2800 can be supported be a plurality of flexible members 2500 (such as metal wires) for connecting the second axial printed circuit board 2320 to the resilient element 2400 which is near the first magnetic elements 2240, so that the frame 2600, the carrier 2700, and the optical lens 2800 can move relative to the first and second axial printed circuit boards 2220 and 2320 along the Y axis or the X axis.

When an electrical current is applied to the second axial coil 2330, a magnetic force is generated between the second axial coil 2330 and the second magnetic element 2940 to move the frame 2600, the carrier 2700, and the optical lens 2800 relative to the second axial printed circuit board 2320 along the X axis, so as to achieve the function of optical image stabilization (OIS).

The third axial coils 2930 in FIGS. 2 and 3 are disposed on the carrier 2700, and the second magnetic elements 2940 are disposed on the frame 2600, corresponding to the third axial coils 2930. Here, the third axial coils 2930 are arranged on opposite sides of the carrier 2700, and the two second magnetic elements 2940 are arranged on the inner surfaces of the frame 2600. When an electrical current is applied to the third axial coil 2930, a magnetic force is generated between the third axial coil 2930 and the second magnetic elements 2940 to move the carrier 2700 and the optical lens 2800 relative to the frame 2600 along the Z axis, so as to achieve the function of auto focusing (AF).

It should be noted that the third axial printed circuit board 2920 is fixed to the carrier 2700, the third axial position sensor 2910 is disposed on the third axial printed circuit board 2920, and the third axial sensing object 2950 is affixed to the frame 2600. When the carrier 2700 and the optical lens 2800 move relative to the frame 2600 along the Z axis, the third axial printed circuit board 2920 and the third axial position sensor 2910 also move relative to the frame 2600 along the Z axis. Thus, the position of the carrier 2700 and the optical lens 2800 relative to the frame 2600 along the Z axis can be determined by the third axial position sensor 2910 detecting the relative position of the third axial sensing object 2950.

In this embodiment, the first, second, and third axial position sensors 2210, 2310, and 2910 may be Hall, MR (Magneto Resistance), GMR (Giant Magneto Resistance), or TMR (Tunneling Magneto Resistance) sensors, and they can be disposed on the same side of the carrier 2700. In some embodiments, the third axial position sensor 2910 may be an optical or infrared sensor. When the third axial position sensor 2910 is a Hall, MR, GMR, or TMR sensor, the third axial sensing object 2950 may be a magnet. When the third axial position sensor 2910 is an optical or infrared sensor, the third axial sensing object 2950 may be a light reflecting sheet.

Figure 4A:
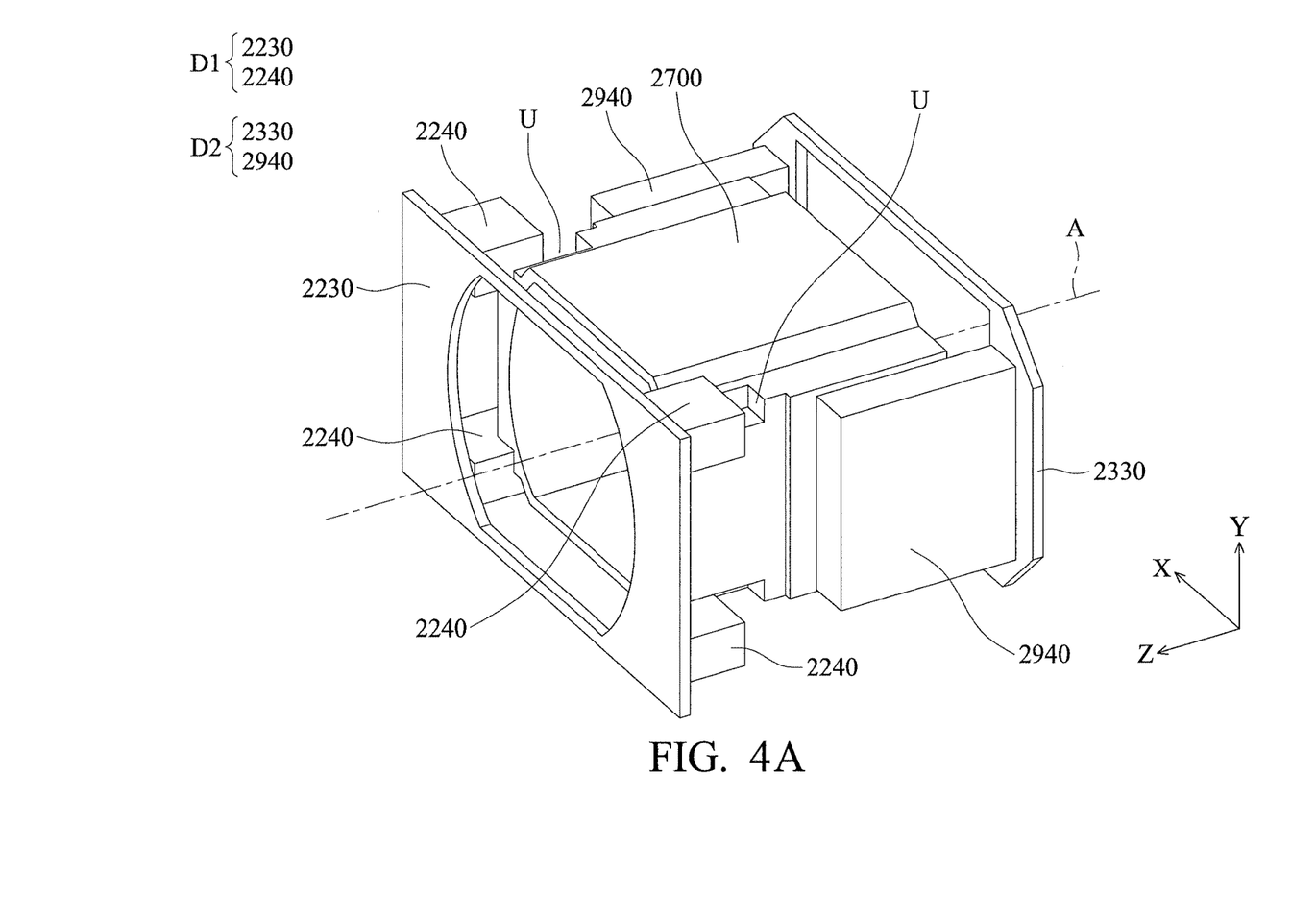
FIGS. 4A-4C illustrate relative positions of the carrier 2700, the first, second magnetic elements 2240, 2940, and the first, second and third axial coils 2230, 2330 and 2930 after assembly.
Figure 4B:
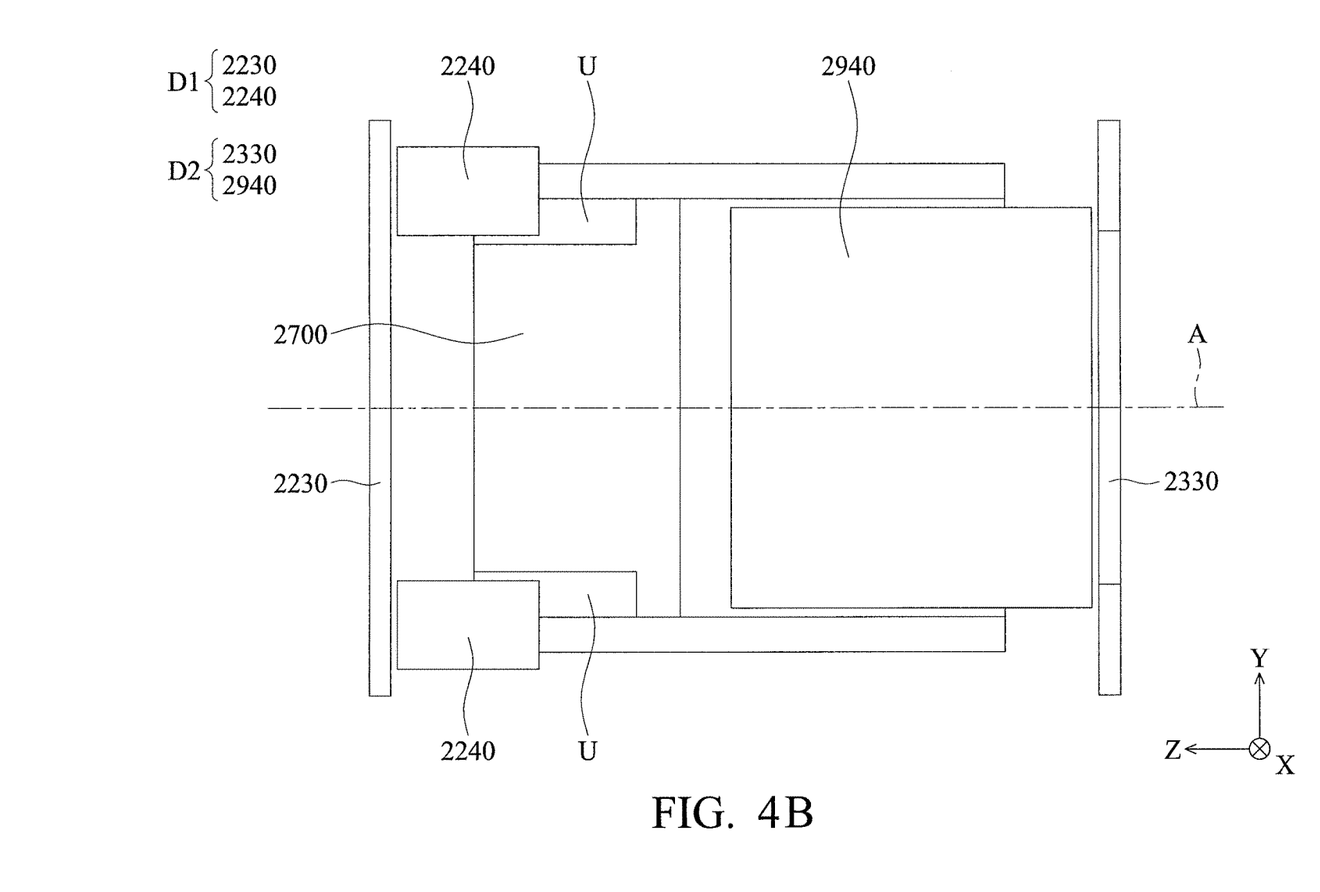
Figure 4C:
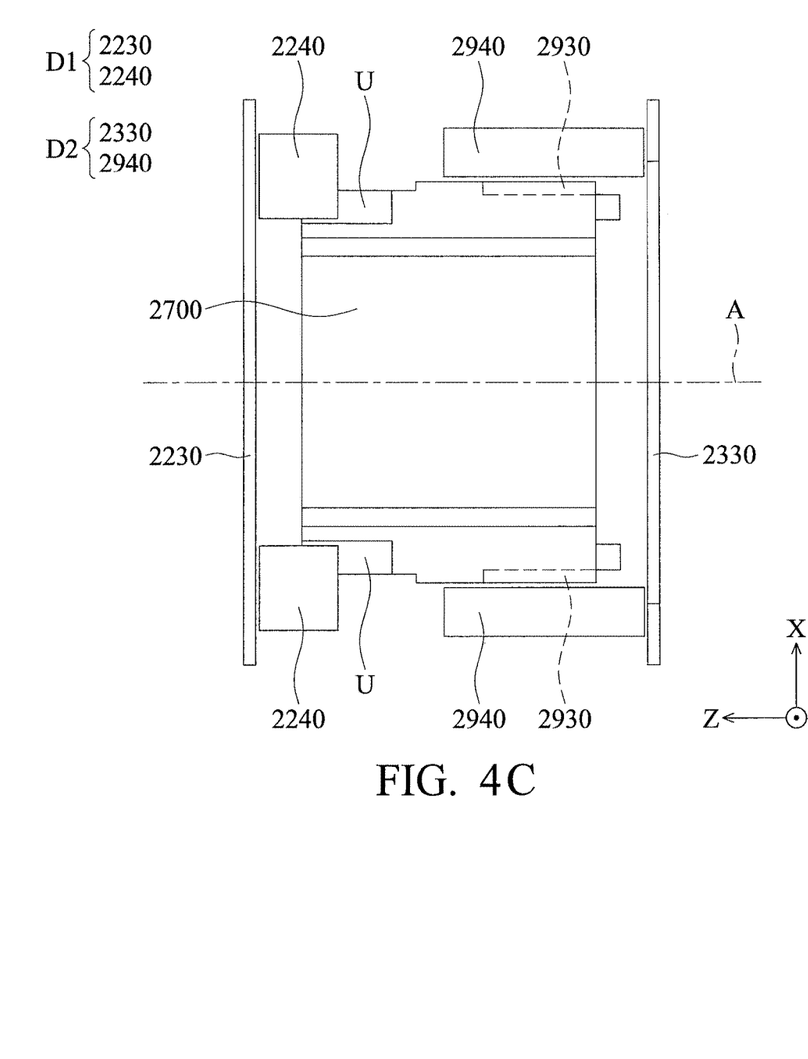

FIGS. 4A-4C illustrate relative positions of the carrier 2700, the first, second magnetic elements 2240, 2940, and the first, second and third axial coils 2230, 2330 and 2930 after assembly. As shown in FIGS. 4A-4C, the first magnetic element 2240 and the first axial coil 2230 form a first driving assembly D1 for controlling the movement of the carrier 2700 along the Y axis. Similarly, the second magnetic element 2940 and the second axial coil 2330 form a second driving assembly D2 for controlling the movement of the carrier 2700 along the X axis. The second magnetic element 2940 can also be cooperatively used with the third axial coil 2930 for controlling the movement of the carrier 2700 along the Z axis.

Referring to FIGS. 4A-4C, when viewed along a direction parallel to the X or Y axis (perpendicular to an optical axis A of the lens unit M2), the first and second driving assemblies D1 and D2 do not overlap. That is, the first and second driving assemblies D1 and D2 are situated in different positions of the Z axis. In this embodiment, a part of the first magnetic element 2240 is received in a recess U at the corner of the carrier 2700, so that the first magnetic element 2240 would not excessively protrude from the upper surface of the carrier 2700, so as to reduce the height of the lens unit M2. Furthermore, the space for accommodating the second magnetic elements 2940 can be also increased since the first magnetic elements 2240 are disposed distant from the second magnetic elements 2940, so that miniaturization of the product and flexibility for mechanism design can be greatly improved.

Figure 4D:
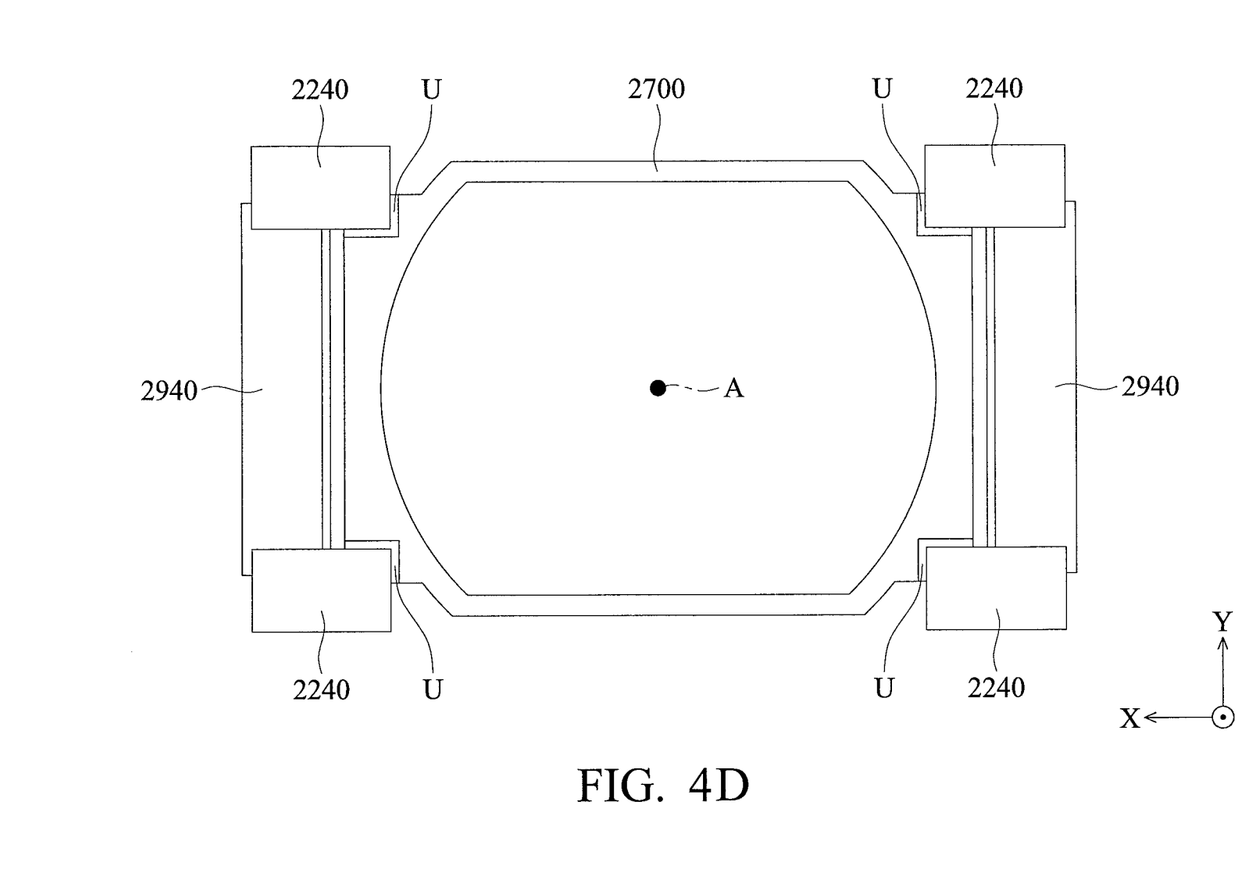
FIG. 4D shows the first magnetic elements 2240 and the carrier 2700 partially overlap when viewed either along the X axis or the Y axis.

FIGS. 4C and 4D also show that the first and second magnetic elements 2240 and 2940 of the first and second driving assemblies D1 and D2 can be arranged on the same sides of the carrier 2700 for efficient space utilization. Specifically, when viewed along the X axis, both of the first, second magnetic elements 2240, 2940 at least partially overlap the carrier 2700. FIGS. 4C and 4D further show that when viewed along the Z axis parallel to the optical axis A of the lens unit M2, the first and second magnetic elements 2240 and 2940 at least partially overlap. It should be noted that the first magnetic elements 2240 and the carrier 2700 at least partially overlap when viewed either along the X axis or the Y axis (FIG. 4D), so as to reduce the dimensions of the lens unit M2 and achieve miniaturization of the product.

Figure 5:
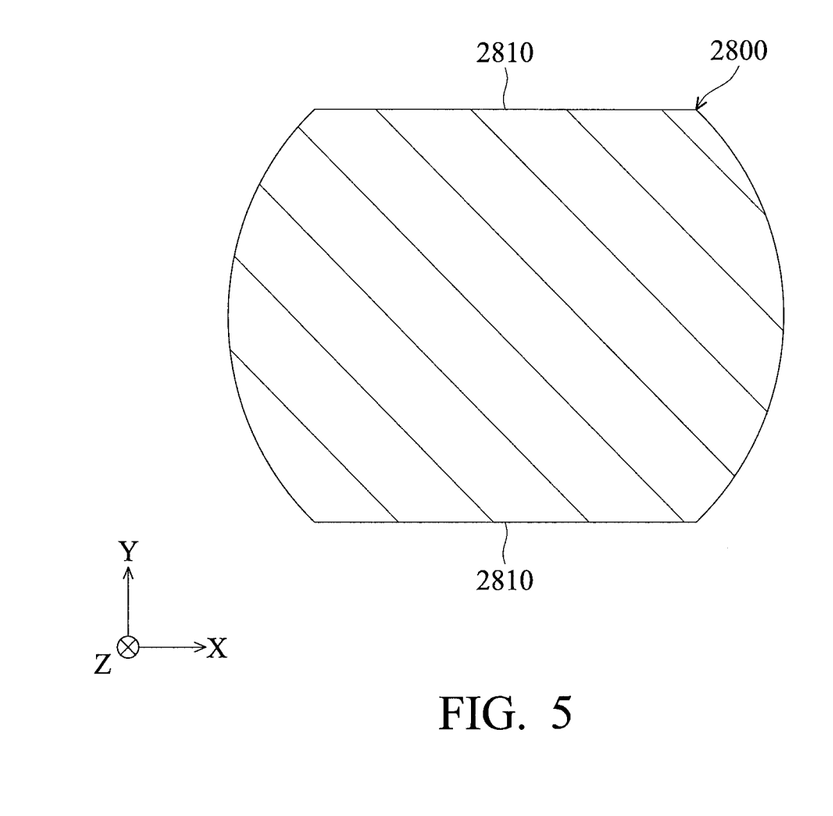
FIG. 5 shows a cross-sectional view of an optical lens, in accordance with an embodiment of the invention.

Referring to FIG. 5, the optical lens 2800 forms at least a flat surface 2810 perpendicular to the Y axis. In this embodiment, two flat surfaces 2810 are formed on opposite sides of the optical lens 2800, such as by cutting process, whereby the thickness of the lens unit M2 and the telephoto lens module 11 along the Y axis can be further reduced.

Figure 6A:
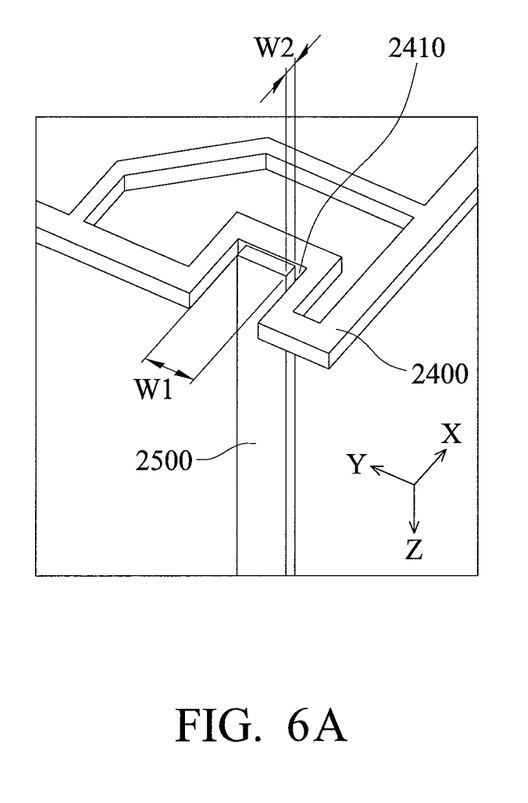
FIG. 6A shows a perspective diagram of a flexible members connecting to a resilient element, in accordance with an embodiment of the invention.
Figure 6B:
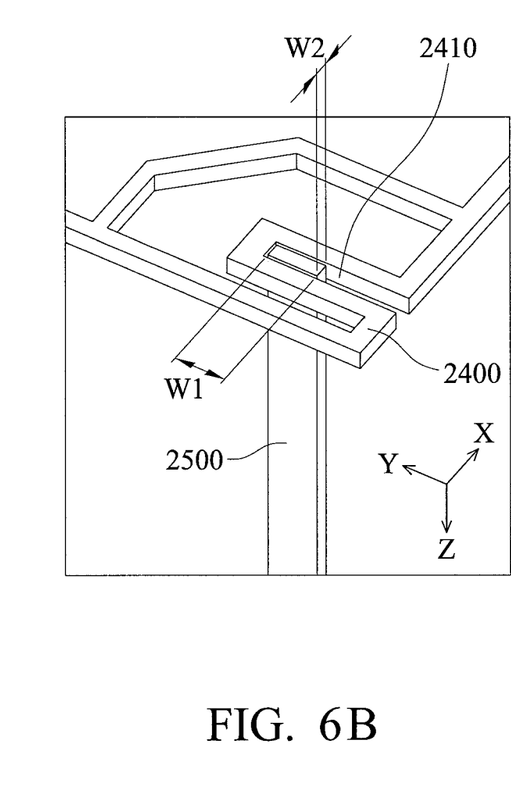
FIG. 6B shows a perspective diagram of a flexible members connecting to a resilient element, in accordance with another embodiment of the invention.

Referring to FIGS. 6A and 6B, as the displacement of the frame 2600 and the carrier 2700 along the Y axis is usually less than that along the X axis, the flexible member 2500 in the lens unit M2 may have a rectangular cross-section, wherein the length W1 along the Y axis exceeds the width W2 along the X axis. Here, the flexible member 2500 is extended into a depressed portion 2410 of the resilient element 2400. The opening direction and the width of the depressed portion 2410 can be modified according to the assembly type of the flexible member 2500. In the embodiment of FIG. 6A, the opening of the depressed portion 2410 is oriented toward −X direction, and the width of the opening corresponds to the length W1 of the flexible member 2500. In the embodiment of FIG. 6B, the opening of the depressed portion 2410 is oriented toward −Y direction, and the width of the opening corresponds to the width W2 of the flexible member 2500.

In summary, the invention provides a camera system and a lens unit thereof. When viewed along a direction perpendicular to an optical axis (Z axis) of the lens unit, the first and second driving assemblies do not overlap. Thus, the first and second magnetic elements can be disposed on the same side of the carrier for efficient space utilization. Furthermore, when viewed along a direction parallel to the optical axis of the lens unit, the first and second magnetic elements in the first and second driving assemblies at least partially overlap each other, and when viewed either along the X axis or the Y axis (FIG. 4D), the first magnetic element and the carrier at least partially overlap, so as to greatly reduce the height and dimensions of the lens unit and facilitate miniaturization of the mechanism.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens unit, comprising:
   a casing;
   a carrier, movably disposed in the casing;
   an optical lens, disposed on the carrier;
   a first driving assembly, configured to move the carrier and the optical lens relative to the casing along a first axis; and
a second driving assembly, configured to move the carrier and the optical lens relative to the casing along a second axis not parallel to the first axis, wherein when viewed along a direction perpendicular to an optical axis of the lens unit, the first and second driving assemblies do not overlap;
   wherein the first driving assembly includes a first magnetic element and a first axial coil adjacent to the first magnetic element, the second driving assembly includes a second magnetic element and a second axial coil adjacent to the second magnetic element, and the lens unit further comprises a third axial coil adjacent to the second magnetic element for moving the carrier and the optical lens relative to the casing along a third axis.

2. The lens unit as claimed in claim 1, wherein the first and second axes are substantially perpendicular to each other.

3. The lens unit as claimed in claim 1, wherein the first driving assembly includes a first magnetic element and a first axial coil adjacent to the first magnetic element, the second driving assembly includes a second magnetic element and a second axial coil adjacent to the second magnetic element, and when viewed along a direction parallel to the optical axis of the lens unit, the first and second magnetic elements at least partially overlap.

4. The lens unit as claimed in claim 3, wherein when viewed along the direction perpendicular to the optical axis of the lens unit, the first and second magnetic elements at least partially overlap the carrier.

5. The lens unit as claimed in claim 1, wherein the first driving assembly includes a first magnetic element and a first axial coil adjacent to the first magnetic element, the second driving assembly includes a second magnetic element and a second axial coil adjacent to the second magnetic element, and when viewed along the direction perpendicular to the optical axis of the lens unit, the second magnetic element and the carrier at least partially overlap.

6. The lens unit as claimed in claim 1, wherein the first driving assembly includes a first magnetic element and a first axial coil adjacent to the first magnetic element, the second driving assembly includes a second magnetic element and a second axial coil adjacent to the second magnetic element, and the first and second axial coils are disposed on opposite sides of the carrier.

7. The lens unit as claimed in claim 1, wherein the first driving assembly includes a plurality of first magnetic elements and a first axial coil adjacent to the first magnetic elements, and the first magnetic elements are disposed on opposite sides of an end surface of the carrier.

8. The lens unit as claimed in claim 1, wherein the optical lens forms a flat surface perpendicular to the first axis.

9. The lens unit as claimed in claim 1, further comprising a first position sensor, a second position sensor, and a third position sensor on the same side of the carrier, to respectively detect the positions of the optical lens and the carrier along the first, second and third axes.

10. The lens unit as claimed in claim 1, further comprising a circuit board, a resilient element, and a flexible member, wherein the second position sensor is disposed on the circuit board, the resilient element connects the casing to the carrier, and the flexible member has a rectangular cross-section and connects the resilient element to the circuit board.

11. A camera system, comprising:
    the lens unit as claimed in claim 1;
    an image sensor; and
    a reflecting unit, wherein light enters the reflecting unit along the first axis, and light is reflected by the reflecting unit along a third axis to the image sensor, wherein the third axis is perpendicular to the first and second axes, and the image sensor and the reflecting unit are disposed on opposite sides of the lens unit.

12. The camera system as claimed in claim 11, wherein the first and second axes are substantially perpendicular to each other.

13. The camera system as claimed in claim 11, wherein the first driving assembly includes a first magnetic element and a first axial coil adjacent to the first magnetic element, the second driving assembly includes a second magnetic element and a second axial coil adjacent to the second magnetic element, and when viewed along a direction parallel to the optical axis of the lens unit, the first and second magnetic elements at least partially overlap.

14. The camera system as claimed in claim 13, wherein when viewed along the direction perpendicular to the optical axis of the lens unit, the first and second magnetic elements at least partially overlap the carrier.

15. The camera system as claimed in claim 11, wherein the first driving assembly includes a first magnetic element and a first axial coil adjacent to the first magnetic element, the second driving assembly includes a second magnetic element and a second axial coil adjacent to the second magnetic element, and when viewed along the direction perpendicular to the optical axis of the lens unit, the second magnetic element and the carrier at least partially overlap.

16. The camera system as claimed in claim 11, wherein the first driving assembly includes a first magnetic element and a first axial coil adjacent to the first magnetic element, the second driving assembly includes a second magnetic element and a second axial coil adjacent to the second magnetic element, and the first and second axial coils are disposed on opposite sides of the carrier.

17. The camera system as claimed in claim 11, wherein the first driving assembly includes a plurality of first magnetic elements and a first axial coil adjacent to the first magnetic elements, and the first magnetic elements are disposed on opposite sides of an end surface of the carrier.

18. The camera system as claimed in claim 11, wherein the optical lens forms a flat surface perpendicular to the first axis.

* * * * *